July 29, 1969 R. W. LESTER ET AL 3,458,657

REMOTE CONTROL OVER POWER LINES BY TRANSMITTING HIGH FREQUENCY PULSES IN PHASE WITH POSITIVE AND NEGATIVE HALF CYCLES OF THE POWER LINE CURRENT

Filed Dec. 28, 1966 3 Sheets-Sheet 1

INVENTORS.
ROBERT W. LESTER
EDMOND G. TRUNK
BY Albert F Kronman
ATTORNEY

INVENTORS.
ROBERT W. LESTER
EDMOND G. TRUNK
BY
Albert F. Kronman
ATTORNEY

INVENTORS.
ROBERT W. LESTER
EDMOND G. TRUNK
BY Albert F. Kronman
ATTORNEY

United States Patent Office 3,458,657

Patented July 29, 1969

3,458,657

REMOTE CONTROL OVER POWER LINES BY TRANSMITTING HIGH FREQUENCY PULSES IN PHASE WITH POSITIVE AND NEGATIVE HALF CYCLES OF THE POWER LINE CURRENT

Robert William Lester, Manhasset, and Edmond G. Trunk, East Meadow, N.Y., assignors, by mesne assignments, to Mastercraft Electronics Corporation, New York, N.Y., a corporation of New York

Filed Dec. 28, 1966, Ser. No. 605,280
Int. Cl. H04h *1/08;* H04g *3/00*
U.S. Cl. 179—2.5 10 Claims

ABSTRACT OF THE DISCLOSURE

A carrier current communication system for sending switching information over an alternating current supply system. A central control circuit includes a plurality of control means each including an "on" and "off" button for energizing one and only one receiver station. Each central control selection means is arranged for sending a sequence of two trains of high frequency pulses over the power lines, the two pulse trains differing from each other only by a phase angle of 180 degrees. At each receiving station, a receiver is selectively tuned for a particular high frequency and each is operated only when the two trains of pulses have the proper phase angle. An alternate system employs two frequencies instead of one, the operation of the second system being substantially the same as the first system.

Background of the invention

This invention relates to a communication system which has particular reference to a phase coded arrangement which is immune to outside disturbances and cannot be triggered by transient current pulses due to switching of high powered devices. The system includes a first means for sending a plurality of high frequency discrete pulses over an alternating current power supply system. These pulses are arranged to be in phase with the positive halves of the alternating current supply. A short time after the first series of pulses are applied to the power lines, a second series of pulses is applied, these pulses being in phase with the negative portions of the alternating current wave. The receiver circuit which is selectively tuned to the high frequency modulation wave, operates a switching means only when both series of pulses are received in the proper sequence. The receiver circuit comprises the usual tuned amplifier and demodulator and also two phase detectors, one for the first series of pulses produced by the positive halves of the wave, and the other for the second series of pulses produced by the negative halves of the wave. When both series of pulses have been received in their proper sequence, a switch is actuated which can operate to either turn on or turn off, power to a load.

For a better understanding of the present invention, together with objects thereof, reference is made to the following description taken in connection with the accompanying drawings.

Description of the preferred embodiment

Figure 1:
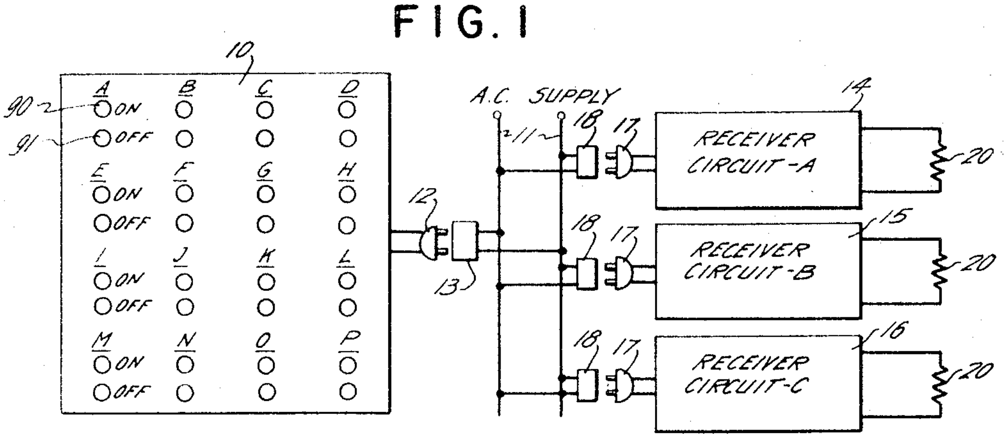
FIGURE 1 is a schematic diagram showing the central station in block form and three receiver circuits also indicated in block. There may be as many as fifty receiver stations.

Referring now to the figures, the circuit shown in FIGURE 1 comprises a central control board 10 having sixteen positions with an ON and OFF button at each position. The number of positions shown is limited only by the number of frequencies used to transmit intelligence over the supply system which includes the conductors 11. The central station 10 may be connected to the power supply by a simple plug 12 and socket 13. The receiver circuits 14, 15, and 16, may be positioned anywhere within the extent of the power supply system which is served by a single transformer. It is well known that high frequency signals cannot pass through a power transformer to effect other branch circuits because of the electrostatic shielding now used on all modern transformers. The receiver circuits may be connected to the AC supply by plugs 17 which fit into sockets 18. The receiver circuits are preferably arranged to switch on a load 20 in order to supply the load with power from the supply lines 11. However, the output switch operated by each receiver circuit may be used to switch many other types of circuits to activate them or disconnect them from separate energy supply circuits.

In FIGURE 1, the central station 10 includes sixteen sets of manually operated buttons for switching remote stations ON or OFF. These sixteen stations are designed by the letters from "A to P," each controlling a predetermined high frequency which may be within the range of 50 to 300 kilocycles per second.

Figure 2:
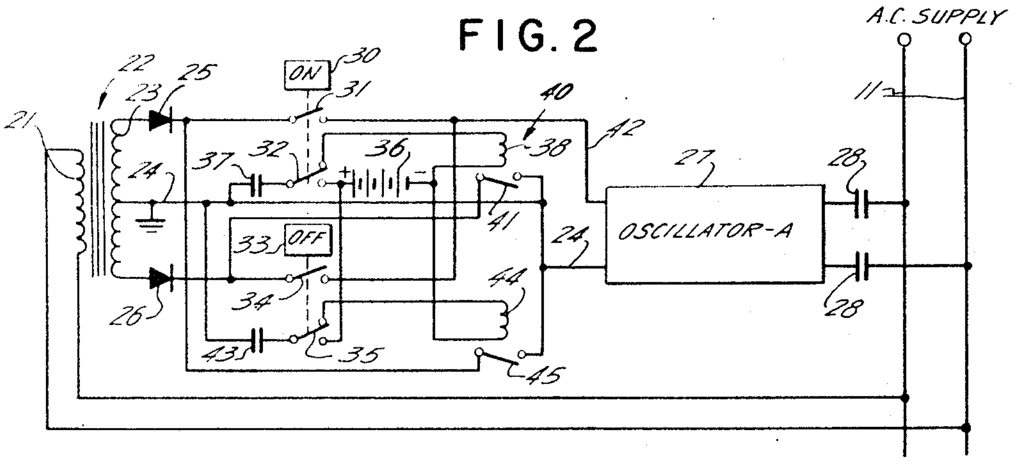
FIGURE 2 is a schematic diagram of connections showing the details of the ON and OFF switches and one oscillator circuit shown in block. There are sixteen of these circuits contained in the central station shown in FIGURE 1, and each of the sixteen oscillator circuits is tuned to a different frequency.

FIGURE 2 shows some of the details of each switching circuit. The alternating current power lines 11 are connected to a primary winding 21 of a transformer 22 having a split secondary winding 23, the mid-point of which is connected to a grounded conductor 24. The ends of winding 23 are connected in series with diode rectifiers 25 and 26, and an oscillator circuit 27 is employed to modulate the half-waves of the 60 cycle power supply in order to create a selective train of signal pulses. The oscillator may be coupled to the supply line by one or more small capacitors 28.

The ON button 30 is mechanically coupled to the two switches 31 and 32. The OFF button is similarly coupled to the two switches 34 and 35. When the ON button is depressed, switch 31 is closed and the positive half cycles from secondary winding 23 are applied to oscillator 27 which modulates the positive halves of the wave by a high frequency and applies this wave to the alternating current supply. At the same time that switch 31 is closed, switch blade 32 is moved to its lower contact and a source of direct current potential 36 is connected to a capacitor 37 so that the capacitor charges. During the time an operator keeps button 30 depressed, the positive halves of the 60 cycle wave are modulated by oscillator 27 and applied to the line.

When the operator releases the ON button 30, the switch blade 32 is moved to its upper contact and the charge of capacitor 37 is discharged through winding 38 of a relay 40 and the relay contacts 41 are closed thereby connecting the negative halves of the power supply system through rectifier 26 and switch 41 to the other terminal of oscillator 27. This action produces a plurality of modulated negative halves of the 60 cycle wave and applies these waves to the AC supply system. As will be described later, this sequential application of the positive and negative modulated portions of the 60 cycle wave can be used to operate a very selective receiving system.

The OFF button is mechanically coupled to switch blades 34 and 35. When this button is depressed, current flows from the lower portion of secondary winding 23 through rectifier 26 and the switch 34 to conductor 42 and the oscillator circuit 27. At the same time switch 35 connects capacitor 43 to the battery 36 so that the capacitor assumes a charge. The depression of button 33 supplies the oscillator 27 with a wave which is derived from the lower portion of secondary winding 23 and is therefore 180 degrees removed from the current supplied through rectifier 25. However, these waves are positive with respect to the grounded conductor 24 and the oscillator 27 modulates these waves in the same manner as the waves through switch 31 and applies them to the power lines 11.

When the OFF button is released, the switch 35 connects capacitor 43 to the winding 44 for a short interval (about 2 seconds). This closes switch 45 and current which passes through rectifier 25 is applied to the oscillator circuit. This action provides the oscillator and the supply line with current pulses which differ by 180 degrees from the previously supplied waves.

Figure 3:
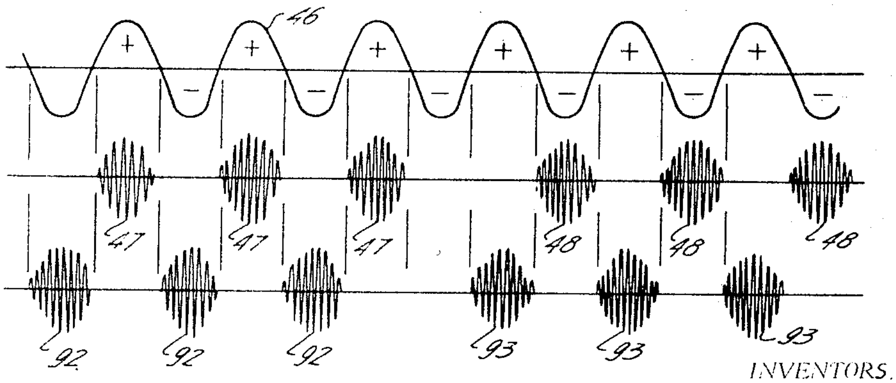
FIGURE 3 is a graph showing the wave form of the 60 cycle power provided by the alternating current supply. There is also shown in this figure some of the high frequency pulses generated by the positive halves of the wave and some of the high frequency pulses generated by the negative halves of the 60 cycle wave.

The graph in FIGURE 3 shows an alternating current power wave 46. Waves 47 show the modulated portions as they emerge from oscillator 27, these waves obviously derived from the positive halves of the alternating current power supply. The graph also shows waves 48 which are generated by the oscillator 27 when the ON button 30 is released and contacts 41 are closed. These waves obviously are derived from the negative halves of the power supply. The only difference between waves 47 and 48 is their phase relationship, this being 180 degrees from each other.

Figure 4:
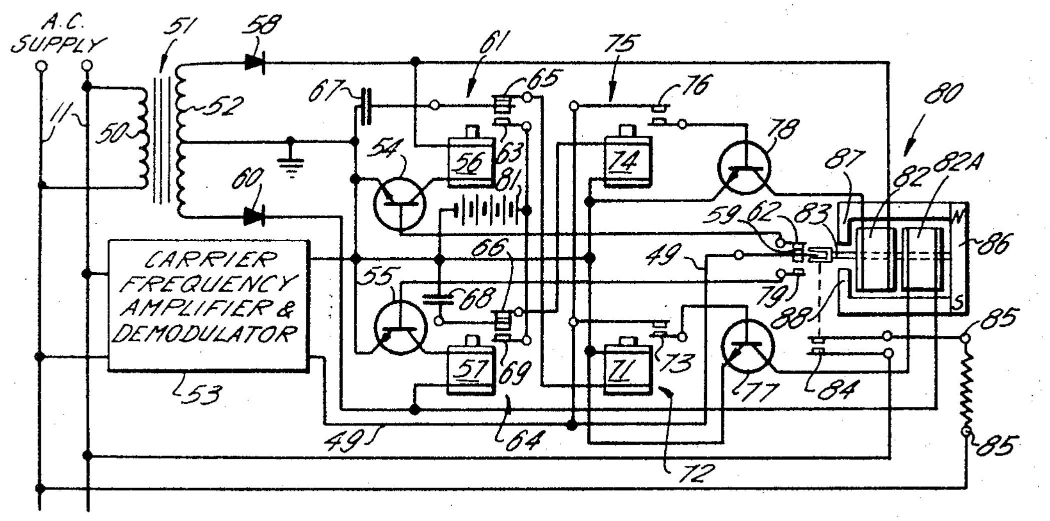
FIGURE 4 is a schematic diagram of connections showing one of the receiver stations. Each of these stations includes a demodulator, a first phase detector, a second phase detector, and switching means for connecting or disconnecting a load.

The circuit diagram shown in FIGURE 4 indicates the details of each receiver circuit 14, 15 or 16, or any other of the plurality of receiving stations at remote locations. The alternating current supply lines 11 are connected to the primary winding 50 of a transformer 51 having two secondary windings 52. The center point of these windings is grounded. The radio frequency pulses are all applied to a radio frequency amplifier and demodulator 53, one portion of which is tuned to the selected frequency and is therefore received by only one receiver circuit. The amplifier and demodulator portion of this circuit are not shown in detail in this figure because this type of circuit is old in the art and has been used before and has been described in many books and periodicals. The output of circuit 53 is supplied to a conductor 49 which is connected to the central contact 59 of a magnetic latching relay 80. This relay will be described in detail later.

Rectifier 58 is connected to a conductor which supplies the winding 56 of a relay 61 having a pair of normally closed contacts 65 and open contacts 63. Winding 56 is connected in series with a transistor 54 which has its base electrode connected to one of the relay contacts 62 on the latching relay 80. The emitter electrode of transistor 54 is connected to ground and the armature of relay 61 is also connected to ground through a storage capacitor 67. In a similar manner rectifier 60 on the opposite side of winding 52 is connected to a winding 57 which is part of relay 64, this relay having a pair of normally closed contacts 66, a pair of open contacts 69, and an armature which is connected through capacitor 68 to the ground conductor. Winding 57 receives its current from a transistor 55 having its base electrode connected to the other contact 79 on the latching relay 80. The emitter of transistor 55 is connected to ground. The normally open contacts of relays 56 and 57 are connected together and to the positive terminal of a battery 81, the negative terminal of which is connected to ground.

The normally closed contacts 65 are connected to a winding 71 of a relay 72 having normally open contacts 73. Relays 72 and 75 are not normally actuated because their windings 71 and 74 are connected to capacitors 67 and 68 which are not normally charged. When relays 61 and 64 are operated and then normalized these capacitors 67 and 68 are first charged by battery 81 and then discharged through windings 71 and 74 thereby closing contacts 73 and 76 for about two seconds. Contacts 73 and 76, when closed, connect the base electrodes of transistors 77 and 78 to conductor 49 which is supplied by pulses which are either at zero phase from the alternating current wave on conductors 11 or at 180 degrees phase angle with this supply line. The emitters of transistors 77 and 78 are connected to ground while their collector electrodes are respectively connected to windings 82 and 82A on relay 80. The armature 83 of relay 80 is mechanically coupled to the central contact 59 and is also coupled to another pair of normally open contacts 84 which may run directly to load terminals 85 or may run to a TRIAC semi-conductor switching device which may then be coupled to a load (see FIGURE 8). The load contacts may be connected in series with the supply lines 11 or they may be connected in series with any other source of electrical power.

The latching relay 80 includes two coils 81 and 82 mounted around the armature 83. It also includes a permanent magnet 86 which may be a part of the base or it may be mounted in another portion of the magnetic circuit. The relay has two magnetic poles 87 and 88, and when the armature 83 is moved by one of the coils to make contact with pole 87 at is shown in FIGURE 4, flux from the permanent magnet 86 exerts a force on the armature and causes it to remain in that position. Winding 82 is arranged so that current through it moves the armature to the position shown while current through winding 82A causes the armature to move to the opposite pole 88, close contacts 84, and remain in that position due to the attraction of pole 88.

The operation of this circuit is as follows: let it be assumed that the armature 83 is in the position shown and contacts 84 are open. Let it also be assumed that a series of pulses of zero phase angle are first applied over conductor 11 and then a series of pulses 180 degrees out of phase are next applied. The disposition and phase of these pulses is shown in FIGURE 3, and are identified by characters 47 and 48. When the zero phase pulses are first received they are applied to conductor 49, contacts 59–62, and the base electrode of transistor 54 thereby permitting current to flow from rectifier 58, through winding 56, the collector and emitter of electrodes of transistor 54, and back to the mid-point of winding 52 by way of the ground conductor. This current opens contacts 65 and closes contacts 63 thereby charging capacitor 67 to a direct current potential supplied by battery 81. The train of pulses which actuates relay 61 exists for only the length of time the operator presses the ON button 90 in panel 10. When the operator releases the button, the train of pulses is applied to conductors 11. As soon as the first train stops, contacts 65 are again closed and the charge on capacitor 67 is applied to winding 71 of relay 72 and contacts 73 are closed for about 2 seconds. When contacts 73 are closed, conductor 49 is connected to the base electrode of transistor 77 and the train of pulses of opposite phase are applied to this transistor making it conductive only during the times that negative pulses flow through rectifier 60 from winding 52. The collector of transistor 77 is connected in series with winding 82A, and rectifier 60, and the second train of pulses thereby causes a current to flow in winding 82A, and the armature 83 is operated to open contacts 59, close contacts 79 as well as contacts 84. This action turns on the load either directly or by means of a semi-conductor switching circuit (see FIGURE 8). Since the armature is retained in its operated condition, the load terminals 85 send current through the load for an indefinite period.

Now let it be assumed that the operator desires to disconnect the load and load terminals from the power supply. The OFF button 91 (FIGURE 1) is depressed and this action, as explained above in connection with FIGURE 2, first sends a series of modulated pulses 92 which are in phase with the negative halves of the main wave (see FIGURE 3). When the operator releases the OFF button another train of pulses is transmitted over the supply lines 11, these pulses 93 being 180 degrees out of phase from pulses 92 and in phase with the positive halves of the waves on the supply line. Referring now to FIGURE 4, the first train of pulses 92 are transmitted over conductor 49 after being amplified and demodulated and pass through contacts 59–79 since the armature is now in its lower position. This action applies the pulses to the base electrode of transistor 55 and winding 57 of relay 64. Since the pulses 92 occur at the same time as negative pulses through rectifier 60, the relay 64 is actuated and normally open contacts 69 are closed, charging capacitor 68 from battery 81. As soon as the wave train stops, the relay is normalized and contacts 66 are closed, thereby delivering the charge on capacitor 68 to the winding 74 of relay 75, closing contacts 76, and applying current to the base electrode of transistor 78 and thereby permitting current to flow through winding 82, provided the pulses from winding 52 in series with rectifier 58 are in phase with the pulse trains on conductor 49. As explained above, when button 91 is pushed in the pulse trains are in phase with the negative half of the wave. When the button is released and contacts 66 are closed, the train of pulses 93 occur at the same time as the positive halves of the wave, therefore winding 82 carries current, the armature 83 is moved to its original position, contacts 84 are opened, and the load terminals are disconnected from the power lines.

It is obvious from the above explanation that relay 80 can be actuated the first time to apply current to the load only when two trains of pulses (a first positive and a second negative) are applied to the detector circuit. Also, in order to disconnect the load, another train of pulses comprising a first negative series and then a positive series is necessary to normalize the relay 80 and disconnect the load terminals from the power lines.

Figure 5:
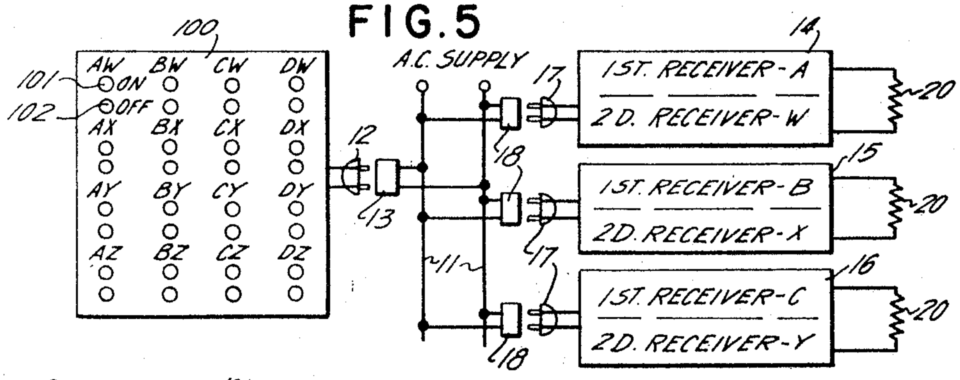
FIGURE 5 is a schematic diagram of connections showing an alternate arrangement of sending and receiving stations, each of the sending channels and each of the receiving channels containing means for operating on two frequencies instead of one.

The above preferred circuit uses only one frequency for each receiving station. Only one oscillator and one receiver circuit are necessary for each remote station. An alternate arrangement using two oscillators for each sending channel and two receivers for each remote station can be applied to a similar circuit which produces the same result. The central station panel 100 (FIGURE 5) includes sixteen control stations, each having an ON button 101 and an OFF button 102. Each control station has been designated with two frequencies, the first frequency being designated by letters A, B, C, and D, the second set of frequencies being designated by letters W, X, Y and Z. The combinations of these frequencies, taken two at a time result in the sixteen control stations which can be used to control sixteen remote stations, each having two receiver circuits tuned to similar frequencies. In FIGURE 5, the control panel can be connected to a plug 12 and a socket 13 which is connected to the alternating current power supply lines 11. In a similar manner, at each remote station a socket 18 is connected to the supply lines and plugs 17 connect the receiver circuits 14, 15 and 16 to the supply lines. Only three of the sixteen receiver stations are shown in this figure. Each receiver circuit is connected to its own load 20.

Figure 6:
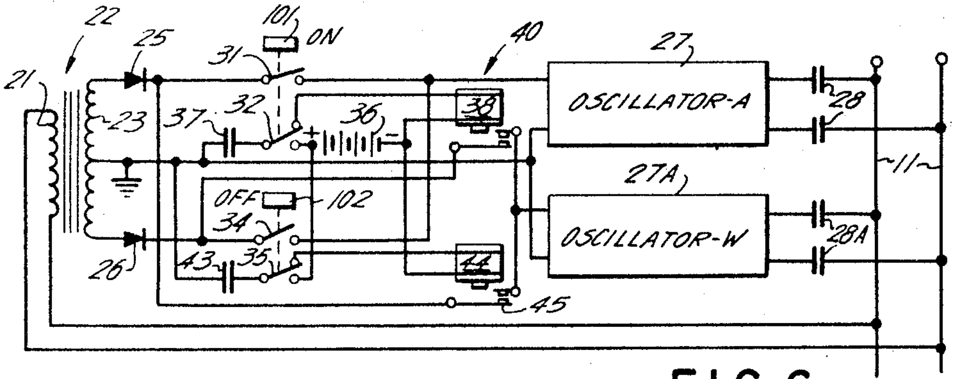
FIGURE 6 is a diagram of connections similar to FIGURE 2 but showing two oscillators instead of one for each transmission station.

The sending station is almost identical to the sending station shown in FIGURE 2 except that in FIGURE 6 there are two oscillators 27 and 27A. The transformer 22 has windings 21 and 23 and is connected to a mid-point ground terminal and rectifiers 25 and 26. The ON button 101 closes two switches 31 and 32 and when the operator releases button 101 capacitor 37 is charged by battery 36 as disclosed previously in connection with FIGURE 2. In a similar manner, button 102 operates switches 34 and 35, first charging capacitor 43 and then discharging capacitor 43 and then discharging the capacitor through relay winding 44.

Figure 7:
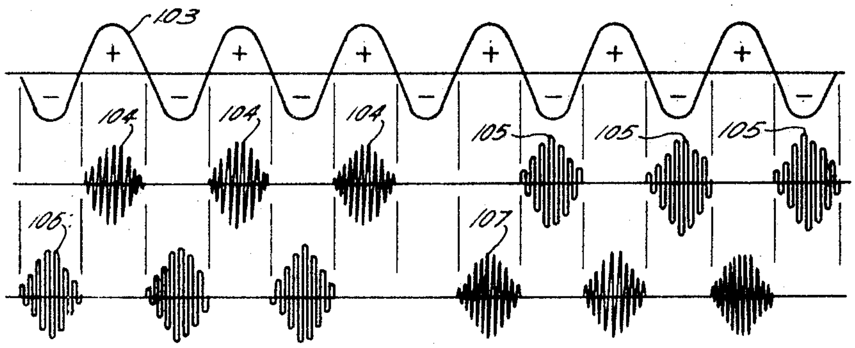
FIGURE 7 is a graph similar to FIGURE 3 showing two types of signal trains. The pulses are similar to the pulses shown in FIGURE 3 except that one series of pulses is modulated at a different frequency.

The result of this action is similar to the action explained above in connection with FIGURE 2, except that when each button is released, the second train of waves is not only removed by 180 degrees from the first train, but its frequency has been changed. This action is shown in FIGURE 7 where the power wave 103 is shown with positive and negative halves, the first train 104 of pulses resulting from the depression of the ON button 101, and coinciding with the positive halves of the wave. The second train of pulses which are produced when the ON button is released comprises oscillations 105 having a different frequency and coinciding with the negative portions of the wave. When the OFF button is depressed, a series of modulated pulses 106 is generated having a frequency corresponding to the frequency of modulations 105 and coinciding with the negative portions of the power wave 103. When the OFF button is released a series of pulses 107 is generated, having a frequency corresponding to the frequency of pulses 104 but this time corresponding to the positive halves of the power wave 103.

Figure 8:
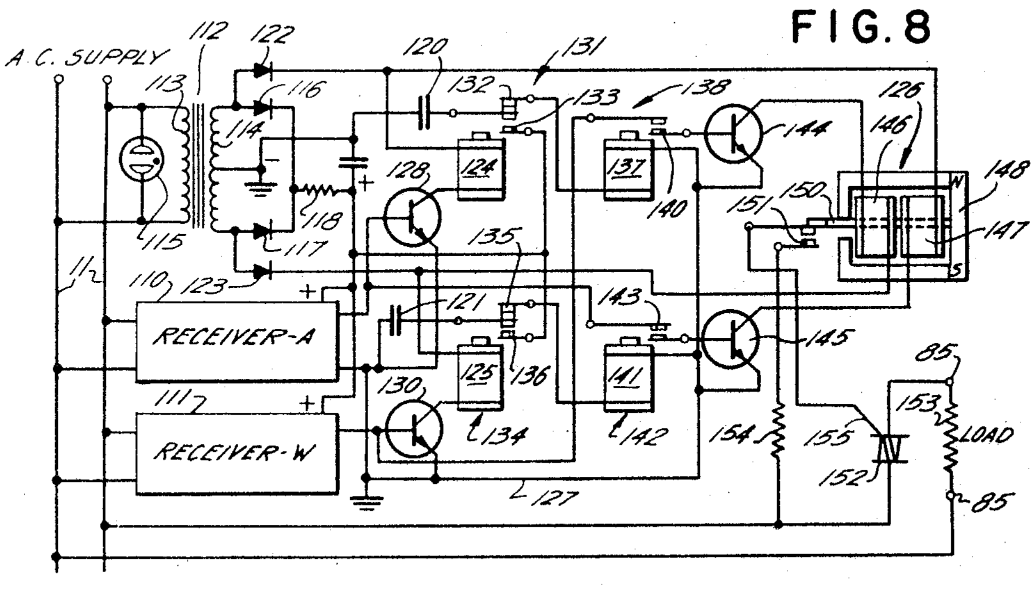
FIGURE 8 is a circuit diagram of connections showing the details of one of the receiver stations of the alternate system.

The receiving circuit at each station is shown in FIGURE 8, where a first receiver 110 is coupled to the power lines 11 and has a response frequency equal to the frequency of the modulations 104 and 107. A second receiver 111 is also coupled to the line, this receiver responding only to the lower frequencies of the pulses 105 and 106. The remote receiver station receives its power from the power lines 11 coupled through a transformer 112 having a primary winding 113 and a split secondary winding 114. The central point of the secondary winding 114 is grounded. An indicator lamp 115 may be connected across the primary winding 113, to indicate that the receiver station has been properly coupled. The end terminals of winding 114 are each connected to two rectifiers 116 and 117, having their cathodes connected together and to a dropping resistor for producing a direct current source of potential which is used for both receiver circuits 110 and 111 and for charging two storage capacitors 120 and 121. The other two rectifiers 122 and 123 are for delivering either the positive or negative halves of the power source to two relay windings 124 and 125 and to the magnetic latching relay 126.

The outputs of receiver circuits 110 and 111 have a common ground connection 127 and are respectively connected to transistors 128 and 130, these transistors having their emitters connected to ground and their collectors respectively connected to windings 124 and 125. Winding 124 is part of a relay 131 having normally closed contacts 132 and normally open contacts 133. In like manner, winding 125 is part of a relay 134 having a pair of normally closed contacts 135 and normally open contacts 136. The armature of each of these relays is connected to its charging capacitor 120 and 121.

Normally open contacts 132 are connected to a winding 137 of relay 138 having normally open contacts 140 while contacts 135 are connected to a winding 141 of relay 142 having a similar pair of contacts 143. Contacts 140 and 143 are connected respectively to the base electrodes of transistors 144 and 145. The emitter electrodes of these transistors are connected to the ground terminal 127 while the collector electrodes are respectively connected to coils 146 and 147 of the magnetic latching relay 126, which includes a permanent magnet 148. Relay 126 is similar to the output latching relay 80, shown in FIGURE 4, except that the contacts operated by the armature are different. In FIGURE 8, the relay armature 150 operates a single pair of normally open contacts 151, these contacts being connected to a semiconductor TRIAC 152 which is coupled between the power supply lines 11 and a load 153. One of the contacts 151 is connected through a resistor 154 to one side of the power supply while the other contact is connected to a firing electrode 155 which operates to make the TRIAC conductive and pass current through the load. This semi-conductor component is well known in the art and its details need not be described here.

The operation of the circuit shown in FIGURE 8 is as follows: Let it be assumed that the supply lines 11 apply a first series of pulses 104 to both receivers 110 and 111. Receiver 110, because of its selective tuning is the only receiver which will send a direct current operating potential to the base of transistor 128 which thereby sends a current through winding 124 and closes contacts 133 while opening contacts 132. When this action occurs, capacitor 120 charges to a direct current potential furnished by winding 114 and rectifiers 116 and 117. Contacts 133 remain closed only as long as the operator retains the control button 101 in a depressed position. When the operator releases button 101, contacts 132 are closed and the charge on capacitor 120 passes through the contacts and through winding 137 and back to the ground conductor 127. This current actuates relay 138 and closes contacts 140 for about two seconds, during which time current flows, in pulses, from the second receiver 111, through contacts 140 to transistor 144, and coil 146, thereby moving the armature 150 to close contacts 151, apply a firing pulse to electrode 155, and make the TRIAC 152 conducting. Relay 126 includes a permanent magnet 148 and when the armature 150 is moved to close contacts 151, the magnetic flux from the permanent magnet holds the armature 150 in its operated condition until such time that current is applied to coil 147 to move the armature back to its original position. The magnetic latching means may hold contacts 151 in their closed position for many hours if necessary, during which time the load 153 receives current. It should be noted here that this sequence of events is possible only if the first train of pulses through receiver 110 is in phase with the pulses received through rectifier 122 and when the second series of pulses is in phase with the pulses transmitted by rectifier 123. Any other sequence of events or any other arrangement of pulses cannot operate both relays 131 and 138 to provide current through coil 146, thereby preventing false triggering for spurious signals.

When the operator depresses the OFF button 102 on panel 100 (see FIGURE 5), a series of pulses 106, in phase with the negative halves of the power supply is transmitted over the power lines 11. These pulses are received by the second receiver 111 and sent through transistor 130 and winding 125 of relay 134. Since these pulses are in phase with the negative halves of the power wave, the pulses through rectifier 123 will operate with them and actuate relay 134, closing contacts 136 to charge capacitor 121 to a positive potential. At the end of this train of pulses, contacts 135 are closed and the charge on capacitor 131 passes through winding 141 to close contacts 143 for about two seconds, thereby sending current through transistor 145 and relay coil 147. This latter current is possible only when the pulses received through receiver 110 coincide with the pulses transmitted by rectifier 122. The current in coil 147 normalizes the armature 150 and opens contacts 151, thereby making the TRIAC 152 nonconducting and cutting off all current through load 153.

Figure 9:
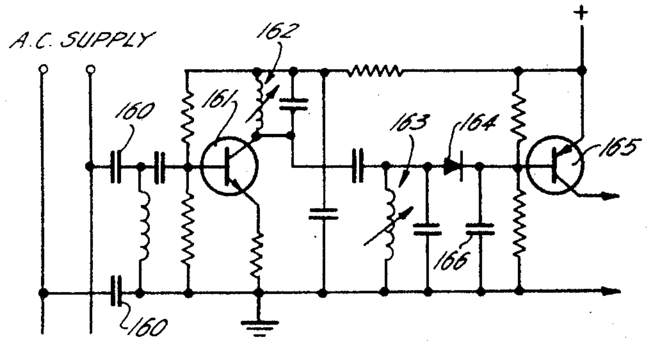
FIGURE 9 is a circuit diagram of a tuned receiver indicated in block form in FIGURE 8.

The circuits in receivers 110 and 111 may be constructed in many different ways. The circuit shown in FIGURE 9 is representative of one of these receivers which include blocking capacitors 160, transistor amplifier 161, a first tuned circuit 162, a second tuned circuit 163, a demodulating rectifier 164, and a transistor amplifier for the output pulses 165. Capacitor 166 removes the major portion of the high frequency components of the received modulated wave so that the output transistor 165 transmits only low frequency pulses.

Figure 10:
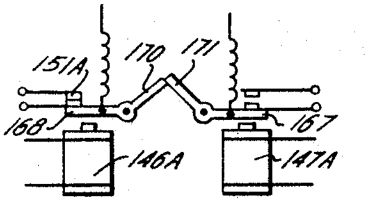
FIGURE 10 is a diagram of a mechanically locked relay which may be used instead of the latched relays shown in FIGURES 4 and 8.

In FIGURES 4 and 8, one form of magnetic latching relay has been shown. There are many other types of latching relays which may be used instead. FIGURE 10 shows one form of mechanical latching arrangement where two coils 146A and 147A can be connected as shown in FIGURE 8. When armature 167 is actuated, the other armature 168 closes contacts 151A and a latching arm 170 moves under a similar latching arm 171 to hold the armature 167 in its operated position after the current has been withdrawn from coil 147A.

Figure 11:
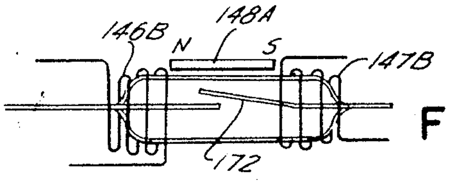
FIGURE 11 is a diagram of a reed relay which may be used instead of the latched relays shown in FIGURES 4 and 8.

FIGURE 11 shows another simplified form of latching relay having coils 146B and 147B and a permanent magnet 148A. The permanent magnet produces flux which holds a reed 172 in either its operated or unoperated position. The operation of this type of relay is the same as the other types disclosed and described.

Having thus fully described the invention, what is claimed as new and desired to be secured by Letters Patent of the United States is:

1. A carrier current control system for sending and receiving switching pulses over alternating current power lines comprising, a transmitter circuit including an oscillator coupled to the power lines for applying a carrier current frequency wave thereto, a first rectifier coupled between the power lines and the oscillator for applying positive half-wave pulses to the oscillator during a first switching time interval and thereby applying modulated pulses to the power lines, a second rectifier also coupled between the power lines and the oscillator for applying negative half-wave pulses to the oscillator during a second switching time interval and thereby applying modulated pulses to the power lines, a first manual switching means for the sequential application of a train of modulated pulses in phase with the positive half-cycles of the power wave followed by a train of modulated pulses in phase with the negative half-cycles of the power wave, a second manual switching means for the sequential application of a train of modulated pulses in phase with the negative half-cycles of the power wave followed by a train of modulated pulses in phase with the positive half-cycles of the power wave, a receiver circuit including a resonant circuit coupled to the power lines for receiving the trains of modulated pulses sent by the transmitter circuit, and a latching relay having contacts for coupling a load circuit to an electrical supply line, said receiver circuit also including a first receiver rectifier coupled to the power lines for transmitting positive half-waves therefrom, a first relay coupled between the first receiver rectifier and the tuned receiver circuit for actuation only when the received modulated waves are in phase with the positive halves of the power wave and are tuned to said resonant circuit, a second receiver rectifier coupled to the power lines for transmitting negative half-waves therefrom, a second relay coupled between the second receiver rectifier and the tuned receiver circuit for actuation only when the received modulated waves are in phase with the negative halves of the power wave, said first relay including contacts which actuate a first coupling circuit between the tuned receiver circuit and said latching relay for actuating said latching relay only when a train of modulated pulses are received which are in phase with the negative half-waves of the power supply.

2. A control system as claimed in claim 1 wherein additional coupling circuits are provided for disconnecting the load from the power lines, said additional circuits including a manually operable switching means at the transmitting circuit for the sequential application of a train of modulated pulses in phase with the negative half-cycles of the power wave followed by a train of modulated pulses in phase with the positive half-cycles of the power wave, said second relay at the receiver circuit including contacts which actuate a second coupling circuit between the tuned receiver circuit and the latching relay for normalizing the latching relay and disconnecting the load only when a train of modulated pulses are received which are in phase with the positive half-waves of the power supply.

3. A control system as claimed in claim 1 wherein said transmitter is provided with a plurality of oscillators, each tuned for transmitting modulated pulses at different frequencies, and a plurality of receiver stations each provided with a tuned receiver circuit resonant to the frequency transmitted by one of the oscillator circuits.

4. A control system as claimed in claim 1 wherein said first manual switching means comprises a first normally open switch connected between the first rectifier and the oscillator and a second switch having a pair of normally open contacts and a pair of normally closed contacts, said normally open contacts in the second switch connected between a storage capacitor and a relay winding for connecting said second rectifier to the oscillator when the first manual switching means is released.

5. A control system as claimed in claim 1 wherein said second manual switching means comprises a first normally open switch connected between the second rectifier and the oscillator and a second switch having a pair of normally open contacts and a pair of normally closed contacts, said normally open contacts in the second switch connected between a storage capacitor and a relay winding for connecting said first rectifier to the oscillator when the second manual switching means is released.

6. A control system as claimed in claim 1 wherein the transmitter circuit includes two oscillators for each transmitting setting designed to cooperate with a single receiver station, said oscillators each coupled to the first and second manual switching means for alternately modulating trains of transmitted half-waves with alternate values of frequency modulation.

7. A control system as claimed in claim 6 wherein each of said receiver circuits includes two resonant circuits each resonant at a frequency equal to a modulation frequency produced by the transmitting circuit.

8. A control system as claimed in claim 6 wherein said receiver circuit includes a first relay having a winding coupled between one resonant circuit and a first rectifier which passes only positive half-waves from the power lines, a second relay having a winding coupled between the other resonant circuit and a second rectifier.

9. A control system as claimed in claim 7 wherein said first and second resonant circuits are coupled to a magnetic latching relay having two windings, one of the windings for receiving negative half-wave pulses and for actuating the relay armature to close a pair of contacts and thereby connect a load to a source of electric power, the other of said windings for receiving positive half-wave pulses and for actuating the relay armature to open a pair of contacts and thereby disconnect a load from a source of electric power.

10. A control system as claimed in claim 9 wherein said magnetic latching relay includes contacts which are coupled to a semiconductor switch connected in series with a load and a source of electric power.

References Cited

UNITED STATES PATENTS 2,285,684 6/1942 Seeley ---------- 340—171 X

RALPH D. BLAKESLEE, Primary Examiner

WILLIAM S. FROMMER, Assistant Examiner

U.S. Cl. X.R.

340—171, 310